（12） United States Patent
Andou et al.

(10) Patent No.: US 7,394,513 B2
(45) Date of Patent: Jul. 1, 2008

(54) DISPLAY DEVICE HAVING PARTICULAR SIGNAL LINES

(75) Inventors: Shoichi Andou, Mie (JP); Mutsumi Nakajima, Nara (JP); Ichiro Shiraki, Nara (JP); Keisuke Yoshida, Nara (JP); Keiichi Ina, Tokyo (JP)

(73) Assignee: Sharp Kabushiki Kaisha, Osaka (JP)

( * ) Notice: Subject to any disclaimer, the term of this patent is extended or adjusted under 35 U.S.C. 154(b) by 506 days.

(21) Appl. No.: 11/047,820

(22) Filed: Feb. 2, 2005

(65) Prior Publication Data

US 2005/0168678 A1    Aug. 4, 2005

(30) Foreign Application Priority Data

Feb. 4, 2004    (JP) ............................... 2004-028592

(51) Int. Cl.
 *G02F 1/1343* (2006.01)
(52) U.S. Cl. ........................... 349/145; 349/38; 349/39
(58) Field of Classification Search ................. 349/145, 349/38–39, 44
 See application file for complete search history.

(56) References Cited

U.S. PATENT DOCUMENTS

| | | | |
|---|---|---|---|
| 5,144,288 A | 9/1992 | Hamada et al. ............. 340/702 |
| 5,459,595 A | 10/1995 | Ishiguro et al. ............... 359/59 |
| 5,459,596 A | 10/1995 | Ueda et al. | |
| 5,600,461 A | 2/1997 | Ueda et al. | |
| 5,659,375 A | 8/1997 | Yamashita et al. | |
| 5,786,876 A | 7/1998 | Ota et al. | |
| 5,822,026 A * | 10/1998 | Matsuo ........................ 349/38 |
| 5,946,058 A | 8/1999 | Kamada et al. | |
| 5,953,088 A | 9/1999 | Hanazawa et al. | |
| 5,966,189 A | 10/1999 | Matsuo | |
| 5,986,723 A | 11/1999 | Nakamura et al. | |
| 6,040,886 A | 3/2000 | Ota et al. | |
| 6,172,729 B1 * | 1/2001 | Ikeda .......................... 349/145 |
| 6,400,427 B1 | 6/2002 | Hanazawa et al. | |
| 6,414,729 B1 | 7/2002 | Akiyama et al. | |
| 6,507,375 B1 * | 1/2003 | Kawahata .................... 349/38 |
| 6,563,561 B1 | 5/2003 | Ota et al. | |
| 6,587,165 B2 | 7/2003 | Hashimoto et al. | |
| 6,674,499 B2 | 1/2004 | Nakamura | |
| 2002/0057391 A1 | 5/2002 | Nakamura | |

(Continued)

FOREIGN PATENT DOCUMENTS

CN    1338658 A    3/2002

(Continued)

OTHER PUBLICATIONS

Office Action mailed Jun. 29, 2007 in corresponding U.S. Appl. No. 11/042,545.

*Primary Examiner*—Mike Qi
(74) *Attorney, Agent, or Firm*—Nixon & Vanderhye P.C.

(57) ABSTRACT

A display device includes: a plurality of signal lines which extend in a zigzag manner in a column direction and to which image signals are supplied, respectively; an insulation film which covers the plurality of signal lines; and a plurality of pixel electrodes which are formed on the insulation film and to which the image signals are input from the plurality of signal lines, respectively. A distance between ones of the pixel electrodes located adjacent to each other in the column direction is equal to or larger than a line width of the signal lines.

9 Claims, 14 Drawing Sheets

U.S. PATENT DOCUMENTS

| | | |
|---|---|---|
| 2002/0149729 A1 | 10/2002 | Nishimura et al. |
| 2003/0002001 A1 | 1/2003 | Ota et al. |
| 2004/0057391 A1 | 3/2004 | Polyakov |
| 2005/0168665 A1 | 8/2005 | Ina et al. |
| 2005/0168678 A1 | 8/2005 | Andou et al. |

FOREIGN PATENT DOCUMENTS

| | | | |
|---|---|---|---|
| CN | 1363854 A | * | 8/2002 |
| JP | 5-127195 A | | 5/1993 |
| JP | 10-90702 A | | 4/1998 |
| JP | 2000-206560 A | | 7/2000 |
| JP | 2001-318390 A | | 11/2001 |
| JP | 2002-318389 A | | 10/2002 |
| KR | 1999-0080392 A | | 11/1999 |
| KR | 2001-0007405 A | | 1/2001 |
| KR | 2003-0016017 A | | 2/2003 |

* cited by examiner

1

DISPLAY DEVICE HAVING PARTICULAR SIGNAL LINES

CROSS-REFERENCE TO RELATED APPLICATIONS

This nonprovisional application claims priority under 35 U.S.C. §119 (a) on Patent Application No.2004-28592 filed in Japan on Feb. 4, 2004, the entire contents of which are hereby incorporated by reference.

BACKGROUND OF THE INVENTION

1. Field of the Invention

The present invention relates to a display device such as a liquid crystal display (LCD) device, a plasma display panel (PDP), an inorganic or organic electroluminescent (EL) display device, a light emitting diode (LED) display device, a fluorescent display tube, an electric field emission display device, an electrophoretic display device, and an electrochromic display device.

2. Description of the Prior Art

A color LCD using a thin film transistor (TFT) is one of active matrix driven LCDs. A color LCD includes a TFT substrate as an active matrix substrate, a counter substrate disposed so as to be opposed to the TFT substrate and including a common electrode and a liquid crystal layer interposed between the substrates. The TFT substrate includes TFTs provided so that each of the TFTs is located in the vicinity of an intersection point of each of gate lines and an associated one of source lines and pixel electrodes connected to the TFTs, respectively. Red (R), green (G) and blue (B) color filters are disposed so that each color filter corresponds to each pixel electrode, whereby each pixel is formed. Pixels are disposed, for example, in a delta arrangement disclosed in U.S. Pat. No. 5,144,288. U.S. Pat. No. 5,144,288 is hereby incorporated by reference.

FIG. 1 is a plan view schematically illustrating a TFT substrate of an LCD including pixels disposed in a delta arrangement. On a display section 1 of the TFT substrate, gate lines 4 each extending from a gate driver 2 and source lines 5 each extending from a source driver 3 are formed. TFTs 6 are provided so that each of the TFTs 6 is located in the vicinity of an intersection point of each of the gate lines 4 and each of the source lines 5, and pixel electrodes 7 are connected to TFTs 6, respectively. A signal corresponding to each of the pixel electrodes 7 is supplied to the pixel electrode 7 through an associated one of the TFTs 6. Thus, a voltage is applied between each of the pixel electrodes 7 and a common electrode (not shown), so that the optical property of a liquid crystal layer corresponding to a region of each pixel is controlled and a display is performed.

In the TFT substrate of FIG. 1, the gate lines 4 linearly extend in the row direction whereas the source lines 5 extend in a zigzag manner in the column direction. Moreover, the pixel electrodes 7 to which signals are supplied from the same source line 5 are disposed left and right alternatively between adjacent rows, i.e., in a staggered pattern, with respect to each of the source lines 5.

On the other hand, to increase an aperture ratio of each pixel, an LCD with a high aperture ratio in which each source line is covered with an insulation film and each pixel electrode is formed on the insulation film has been developed. However, for example, with the LCD with a high aperture ratio using a delta arrangement, the following problem arises.

FIG. 2 is a plan view schematically illustrating a capacitance between each source line and each pixel electrode in a delta arrangement panel of FIG. 1. As shown in FIG. 2, seen from the top, each of the pixels 7 is interposed between adjacent ones of the source lines 5 in the row direction. For example, in FIG. 2, each of green pixels 7G1 in the first row and green pixels 7G3 in the third row is interposed between an associated one of green pixel source lines 5G for inputting image signals PS to the green pixels 7G and an associated one of blue pixel source lines 5B for inputting image signals PS to blue pixels 7B each of which is located adjacent to the associated one of green pixels 7G in the row direction.

On the other hand, in FIG. 2, each of green pixels 7G2 in a second row and green pixels 7G4 in a fourth row is interposed between an associated one of the green source lines 5G and an associated one of red pixel source lines 5R for inputting image signals PS to red pixels 7R each of which is located adjacent to the associated green pixels 7G in the row direction. In other words, the green pixels 7G1 and 7G3 each being interposed between an associated one of the green pixel source lines 5G and an associated one of the blue pixel source lines 5B and the green pixels 7G2 and 7G4 each being interposed between an associated one of the green pixel source lines 5G and an associated one of the red pixel source lines 5R are arranged alternately between rows. That is, green pixels 7G, each of which is interposed between ones of the source lines 5 of two types located adjacent to each other in the row direction, are arranged so that each of the green pixels 7G appears every second rows. That is, between two rows, green pixels 7G of two types, each of which interposed between different two of the source lines 5, are alternately arranged.

FIG. 3 is an enlarged view partially illustrating the pixel arrangement with one of the green pixels 7G2 in the second row in FIG. 2 being centered. FIG. 4 is a cross-sectional view schematically illustrating a cross section taken along the line A-B of FIG. 3. FIG. 5 is a cross-sectional view schematically illustrating a cross section taken along the line C-D of FIG. 3. As shown in FIGS. 4 and 5, the pixel electrodes 7 and the source lines 5 are disposed with an insulation film 8 interposed therebetween, so that a source-drain capacitance, i.e., a parasitic capacitance exists therebetween. A parasitic capacitance between one of the pixel electrodes 7 and an associated one of the source lines 5 for inputting an image signal PS to the pixel electrode 7 (in other words, one of the source lines 5 which drives the pixel electrode 7) is assumed to be a capacitance Csd1 and a parasitic capacitance between another one of the pixel electrodes 7 and an associated one of the source lines 5 which does not input an image signal PS to the pixel electrode 7 (in other words, one of the source lines 5 which does not drive the pixel electrode 7) is assumed to be a capacitance Csd2. For example, the capacitance Csd1 exists between the red pixel source line 5R and the red pixel 7R and the capacitance Csd2 exists between the red source line 5R and the green pixel 7G or the blue pixel 7B. The potential of the source line 5R is changed due to the capacitances Csd1 and Csd2 and this change influences the potential of the pixel electrode 7. For example, the potential of the green pixel 7G2 located in the second row and interposed between the red pixel source line 5R and the green pixel source line 5G is influenced by the source lines 5R and 5G, and the green pixel 7G1 located in the first row and interposed between the green pixel source line 5G and the blue pixel source line 5B is influenced by the source lines 5G and 5B. Therefore, the potential Vpix of an influenced pixel electrode (e.g., the green pixel 7G) can be expressed by the following equation:

$$Vpix = Vsl\ 0 + (Csd\ 1/Cpix) \times \Delta Vsl\ 1 + (Csd\ 2/Cpix) \times \Delta Vsl$$

2 where Vsl 0 is a potential before the potential is influenced (i.e., a potential applied from the source line 5G to the green pixel 7G via a TFT for inputting an image signal), ΔVsl 1 is a voltage amplitude of the source line 5G for inputting an image signal to the green pixel 7G, ΔVsl 2 is a voltage amplitude of the source line 5R or 5B which does not input an image signal to the green pixel 7G, and Cpix is the sum of capacitances (such as parasitic capacitance, auxiliary capacitance and the like) applied to the green pixel 7G.

FIG. 6 is a plan view illustrating influences of the source lines 5 to the potential of the pixel electrodes 7G. In FIG. 6, the potential of the green pixel 7G1 in an upper row is influenced by the red pixel source line 5R and the green pixel source line 5G, and the potential of the green pixel 7G2 in a lower row is influenced by the green pixel source line 5G and the blue pixel source line 5B. Thus, the respective potentials of the green pixel 7G1 in the upper row and the green pixel 7G2 in the lower row are equal to each other. However, a potential influenced by the red pixel source line 5R and a potential influenced by the blue pixel source line 5B are not always the same and thus the influenced potentials in the green pixel 7G1 in the upper row and the green pixel 7G2 in the lower row might be different from each other. That is, a voltage applied to the green pixels 7G might be different between rows. In this case, luminance difference among pixels in different rows appears as horizontal stripes, so that a uniform display can not be achieved. For example, when the red pixel 7G is in a white display state (i.e., a state where a transmittance is the highest), the green pixel 7G is in a halftone presentation state, and the blue pixel 7B is in a black display state (i.e., a state where a transmittance is the lowest), horizontal stripes markedly appear.

This phenomenon occurs not only to the green pixel 7G but also to the red pixel 7R or the blue pixel 7B. Moreover, this phenomenon may also occur not only in a delta arrangement but also in a mosaic arrangement or a square arrangement.

SUMMARY OF THE INVENTION

It is therefore an object of the present invention is to suppress the occurrence of such horizontal stripes and improve display quality.

For example, in the green pixel 7G, difference between the potential influenced by the red pixel source line 5R and the potential influenced by the blue pixel source line 5B occurs, so that horizontal stripes are generated. That is, the occurrence of such horizontal stripes is caused due that a value for a third term in the above-described equation differs between horizontal lines. Therefore, by giving a smaller value for Csd2 in the third term, the value of the third term becomes smaller and thus horizontal stripes can be suppressed.

The present inventors have focused on reducing a parasitic capacitance Csd2 between one of the pixel electrodes and a source line which does not drive the pixel electrode. For example, with respect to the green pixel 7G, the present inventors has reduced a source-drain capacitance Csd2 influenced by the red pixel source line 5R and the blue pixel source line 5B as much as possible to complete a display device according to the present invention.

A display device according to the present invention includes: a plurality of signal lines each of which extends in a zigzag manner in the column direction and to which image signals are supplied, respectively, an insulation film which covers the plurality of signal lines, and a plurality of pixel electrodes which are formed on the insulation film and to which the image signals are input from the plurality of signal lines, respectively. In the display device, a distance between ones of the plurality of pixel electrodes located adjacent to each other in the column direction is equal to or larger than a line width of the signal lines.

FIG. 7 is a plan view schematically illustrating a pixel arrangement in the display device of the present invention. FIG. 8 is a cross-sectional view illustrating a cross section taken along the line A-B of FIG. 7. In the display device of the present invention, a distance D0 between ones of the pixel electrodes 7 located adjacent to each other in the column direction with an associated one of the signal lines 5 interposed therebetween is equal to or larger than a line width of the signal line 5.

To make comparison with the present invention, a comparative example will be shown in FIGS. 9 and 10. FIG. 9 is a plan view schematically illustrating a pixel arrangement according to the comparative example. FIG. 10 is a cross-sectional view illustrating a cross section taken along the line A-B of FIG. 9. In the display device of the comparative example, a distance d between ones of the pixel electrodes 7 located adjacent to each other in the column direction with an associated one of the signal lines 5 interposed therebetween is smaller than a line width w of the signal line 5. Therefore, in the display device of the comparative example, part of the signal lines 5 extending in the row direction and each of the pixel electrodes 7 overlap when viewed from the top, so that the capacitance Csd2 due to the signal lines 5 is large.

In contrast, in the display device of the present invention, part of the signal line 5 extending in the row direction and the pixel electrodes 7 do not overlap when viewed from the top. Thus, the capacitance Csd2 due to the signal line 5 is small. As has been described with reference to FIG. 6, horizontal stripes appear due to difference in an influenced potential between different source lines. Since a potential is influenced by a parasitic capacitance, the parasitic capacitance Csd2 is reduced, so that the influenced potential is reduced and the difference in an influenced potential between different source lines can be reduced. Therefore, an excellent display grade with less horizontal stripes can be obtained.

In one preferred embodiment of the present invention, in a row direction, at least one of the signal lines and a first pixel electrode to which an associated one of the image signals is input from the signal line form a first capacitance with the insulation film interposed therebetween, and at least one of the signal lines and a second pixel electrode located adjacent to the first pixel electrode in the row direction with the signal line interposed therebetween form a second capacitance with the insulation film interposed therebetween, and the first capacitance is larger than the second capacitance.

Alternatively, in a row direction, part of at least one of the signal lines and a first pixel electrode to which an associated one of the image signals is input from the signal line overlap when viewed from the top and another part of the signal line and a second pixel electrode located adjacent to the first pixel electrode with the signal line interposed therebetween overlap, and an area of a region in which the first pixel electrode and the part of the signal line overlap is larger than an area of a region in which the second pixel electrode and another part of the signal line overlap.

FIG. 11 is a plan view schematically illustrating a pixel arrangement in a display device according to one preferred embodiment of the present invention. FIG. 12 is a cross-sectional view illustrating a cross section taken along the line C-D of FIG. 11. In the display device of the preferred embodiment, the area of an overlapping region in which part of the signal line extending in the column direction and one of two pixel electrodes located adjacent to each other in the row direction overlap when viewed from the top and the area of another overlapping region in which another part of the signal line and the other one of the two pixel electrodes located adjacent to each other in the row direction overlap when viewed from the top are different. For example, as shown in FIGS. 11 and 12, the width D1 of a region in which the green pixel source line 5G and the green pixel 7G to which a image signal is input from the source line 5 overlap is larger than the width D2 of a region in which the green source line 5G and a red pixel 7R overlap. In other words, the first capacitance Csd1 between the green pixel source line 5G and the green pixel 7G is larger than the second capacitance Csd2 between the green source line 5G and the red pixel 7R.

As has been described with reference to FIG. 6, the respective potentials of the green pixel 7G1 in the upper row and the green pixel 7G2 in the lower row, which are influenced by the source line 5G, are equal to each other. In contrast, potentials influenced by other source lines 5R and 5B are different from each other, so that horizontal stripes occur. In the display device of the preferred embodiment, the capacitance Csd2 due to the source lines 5R and 5B is small and thus influences of the source lines 5R and 5B to the potentials can be suppressed. Therefore, difference between the respective potentials of the green pixel 7G1 in the upper row of FIG. 6 and the green pixel 7G2 in the lower row of FIG. 6 is reduced furthermore, so that the occurrence of horizontal stripes can be suppressed.

In another preferred embodiment of the present invention, when viewed from the top, at least part of the signal line and a first pixel electrode to which an image signal is input from the signal line overlap, and the signal line and the second pixel electrode located adjacent to the first pixel electrode with the signal line interposed therebetween do not overlap. In this embodiment, the second capacitance Csd2 can be reduced furthermore, so that the occurrence of horizontal stripes can be suppressed furthermore.

The display device of the present invention may further include a switch element for controlling switching between the pixel electrode and the signal line and a scan line to which a scanning signal for performing open/close control of the switch element is supplied. Moreover, the display device may further include an auxiliary capacitance line for forming an auxiliary capacitance.

A region in which the scan line is formed or a region in which the auxiliary capacitance line is formed may include a region between ones of the pixel electrodes located adjacent to each other in the column direction. In other words, a region between the pixel electrodes located adjacent to each other in the column direction with a the signal line interposed therebetween may be shielded by the scan line or the auxiliary capacitance line.

Moreover, the display device of the present invention may further include a shielding layer which is neither the scan line nor the auxiliary capacitance line. For example, the display device may further include a shielding layer formed in a layer in which the scan line is formed, a shielding layer which is not in contact with any one of lines and electrodes, a shielding layer connected to the scan line, or a shielding layer connected to the auxiliary capacitance line.

Herein, a "row direction" and a "column direction" do not necessarily mean a lateral direction and a longitudinal direction, respectively. Also, the "row direction" and the "column direction" do not necessarily mean two directions intersecting at right angle but two directions crossing each other. For example, the column direction may be set to extend along a direction tilted from the row direction.

According to the present invention, the occurrence of horizontal stripes can be suppressed and display quality can be improved.

DESCRIPTION OF THE PREFERRED EMBODIMENTS

Figure 1:
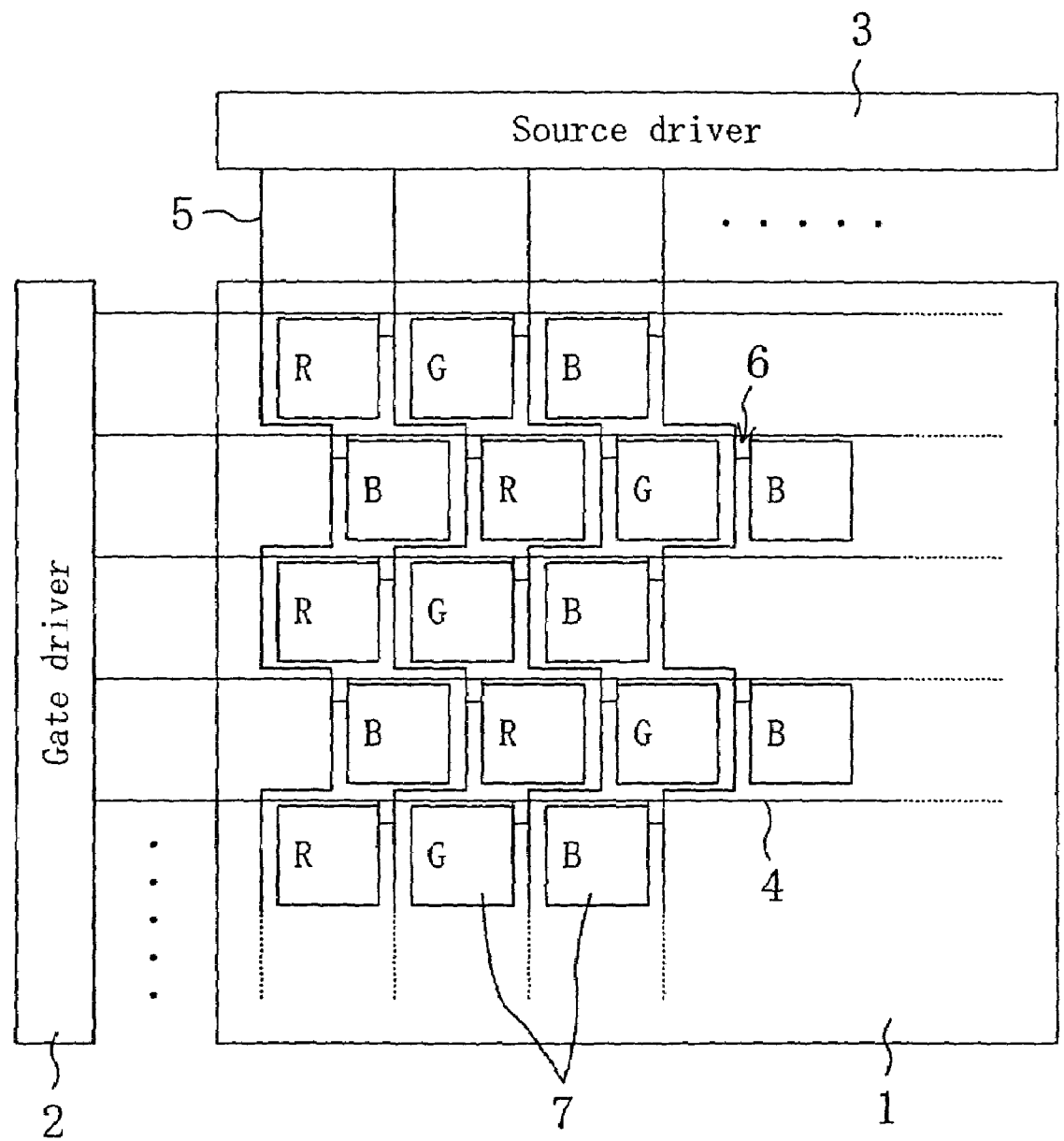
FIG. 1 is a plan view schematically illustrating a TFT substrate of an LCD including pixels disposed in a delta arrangement.
Figure 2:
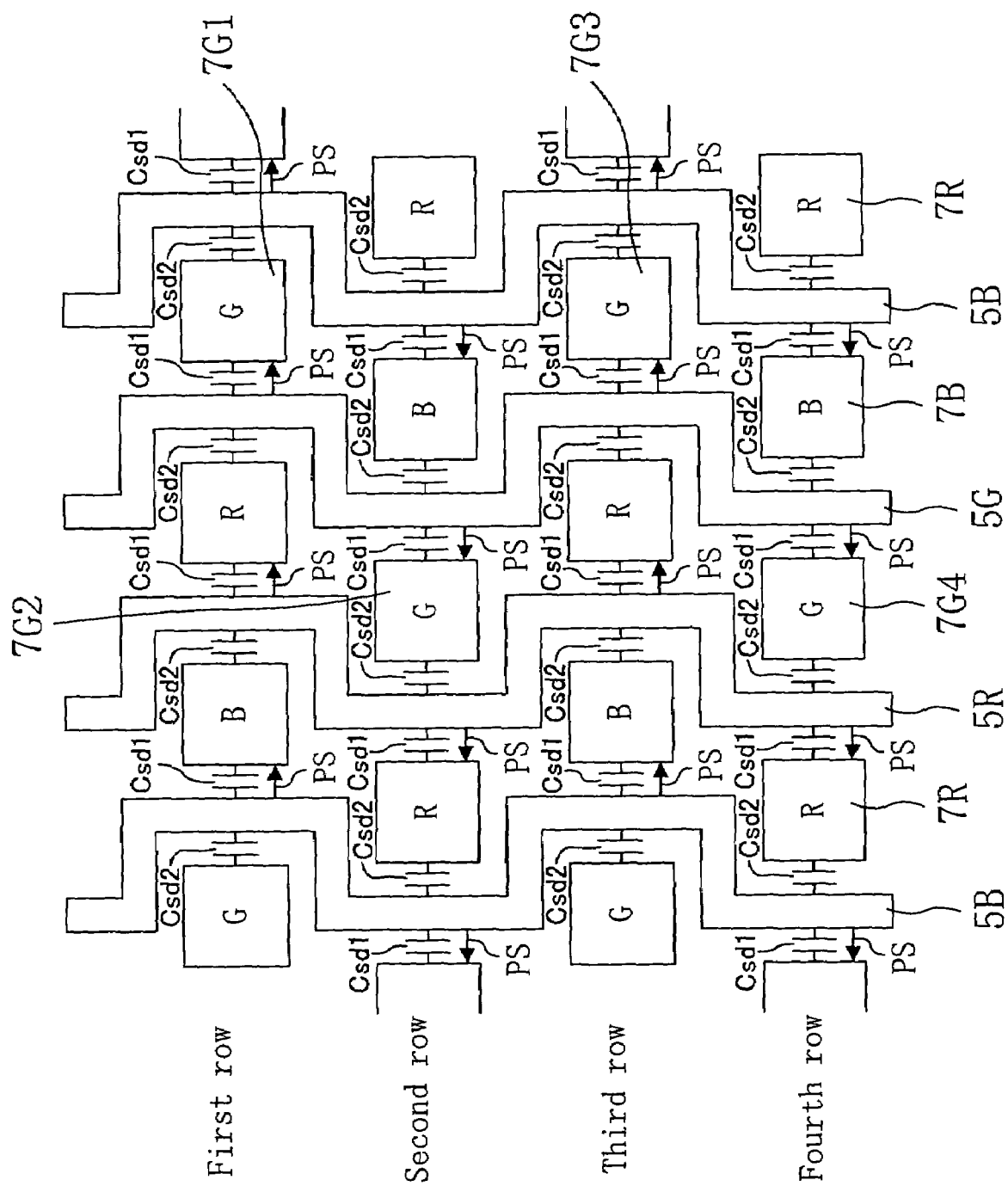
FIG. 2 is a plan view schematically illustrating a capacitance between each source line and each pixel electrode in a delta arrangement panel of FIG. 1.
Figure 3:
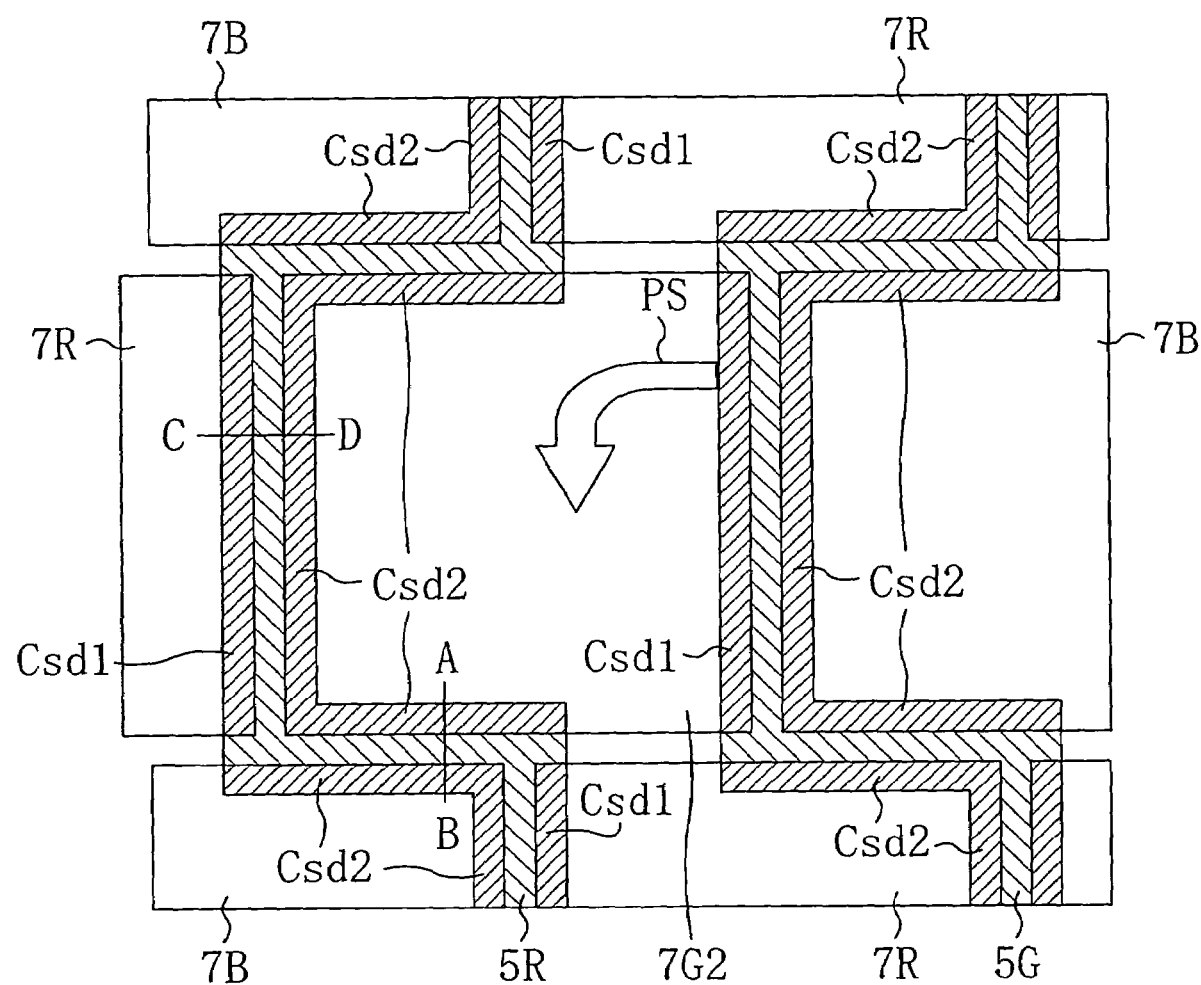
FIG. 3 is an enlarged view partially illustrating a pixel arrangement with one of green pixels 7G2 in a second row in FIG. 2 being centered.
Figure 4:
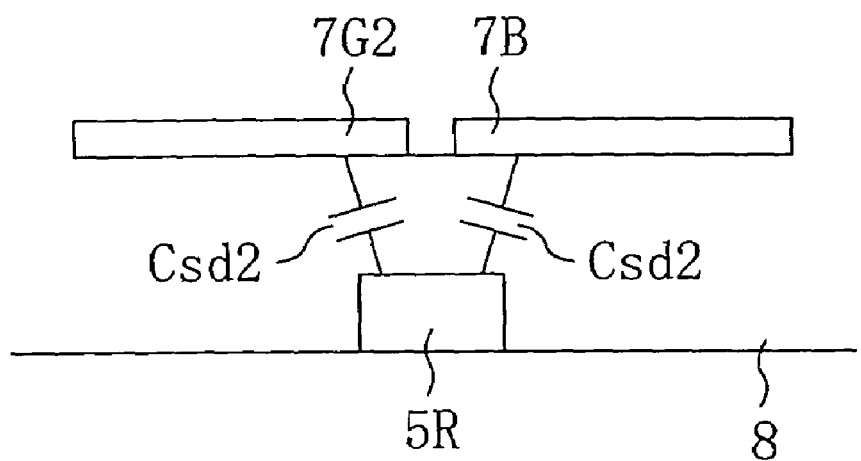
FIG. 4 is a cross-sectional view schematically illustrating a cross section taken along the line A-B of FIG. 3.
Figure 5:
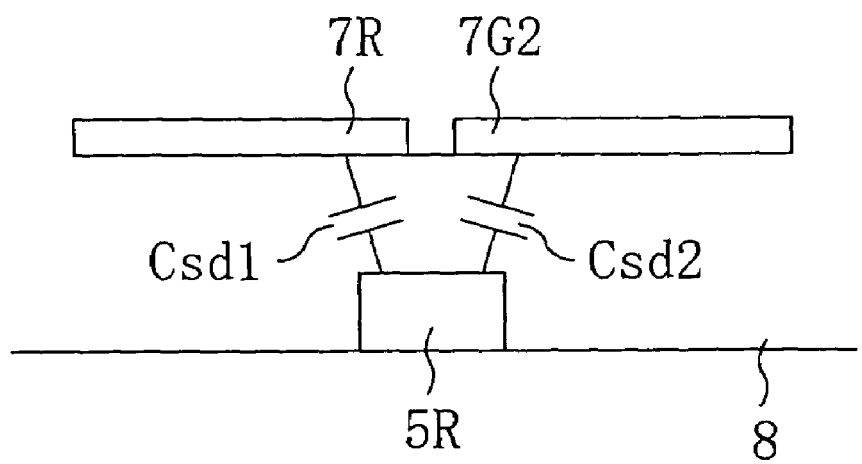
FIG. 5 is a cross-sectional view schematically illustrating a cross section taken along the line C-D of FIG. 3.
Figure 6:
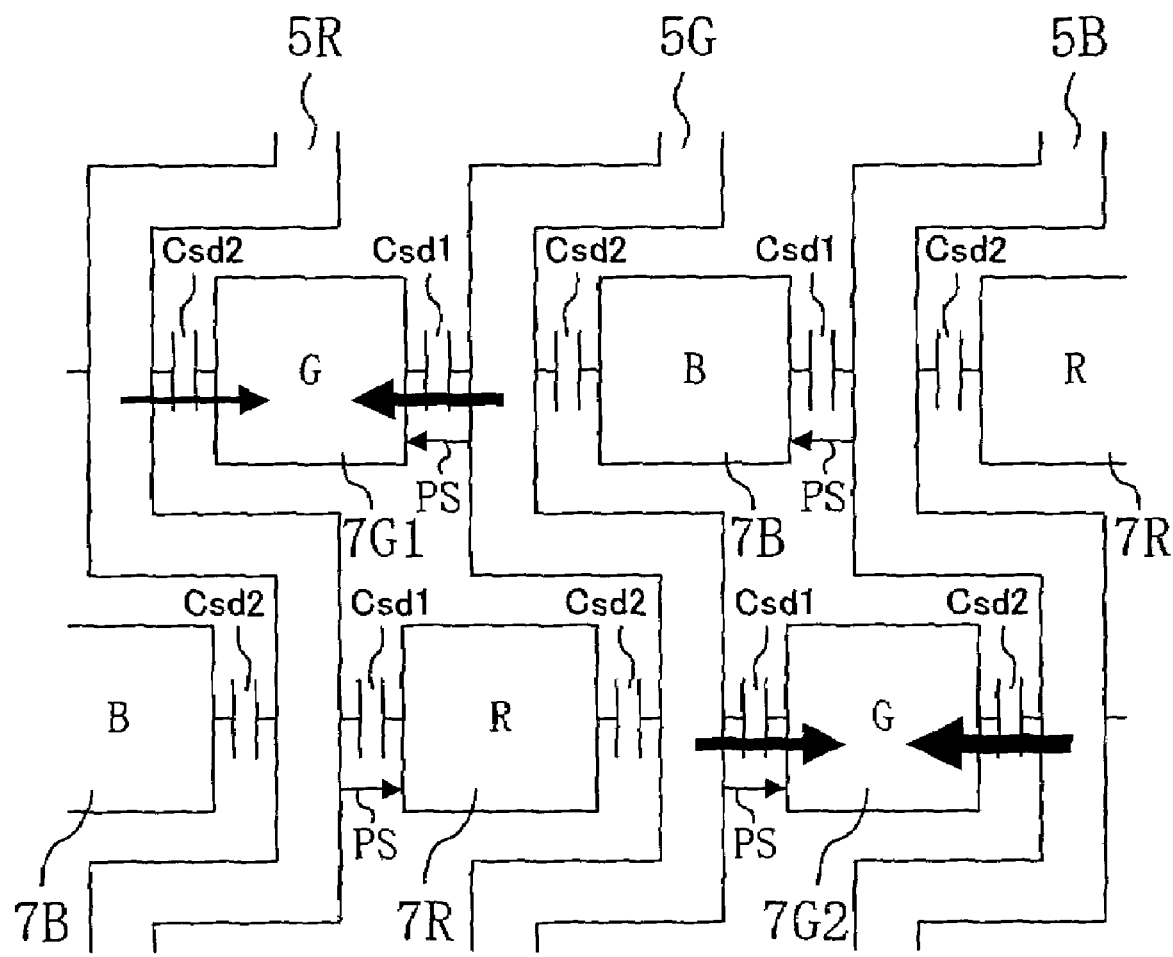
FIG. 6 is a plan view illustrating how source lines 5 influences the potential of pixel electrodes 7G.
Figure 7:
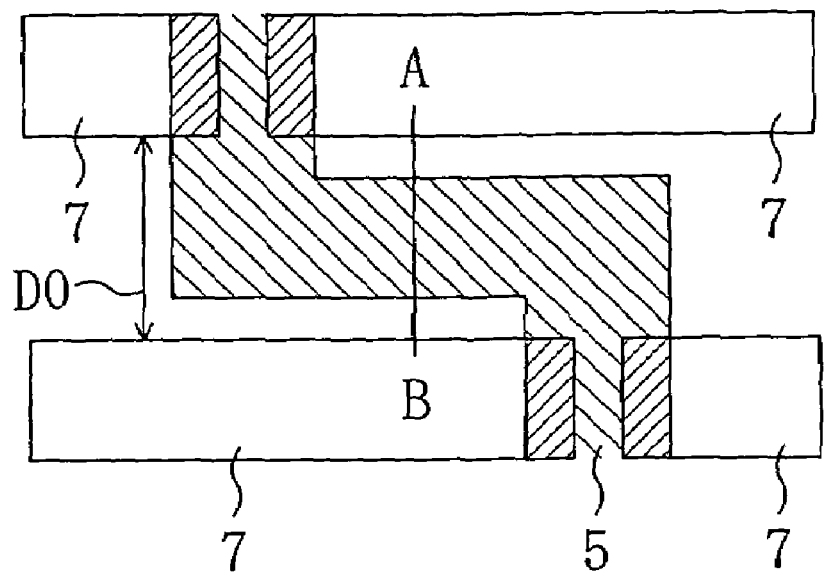
FIG. 7 is a plan view schematically illustrating a pixel arrangement in a display device according to the present invention.
Figure 8:
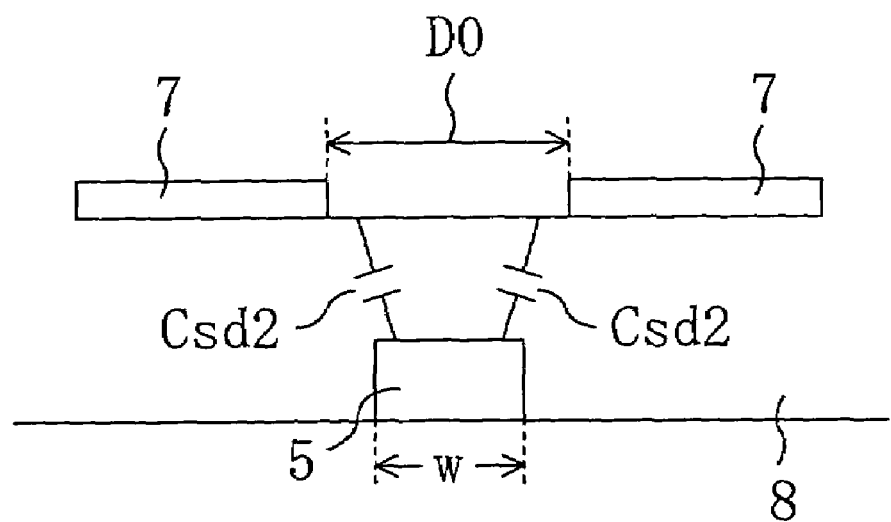
FIG. 8 is a cross-sectional view illustrating a cross section taken along the line A-B of FIG. 7.
Figure 9:
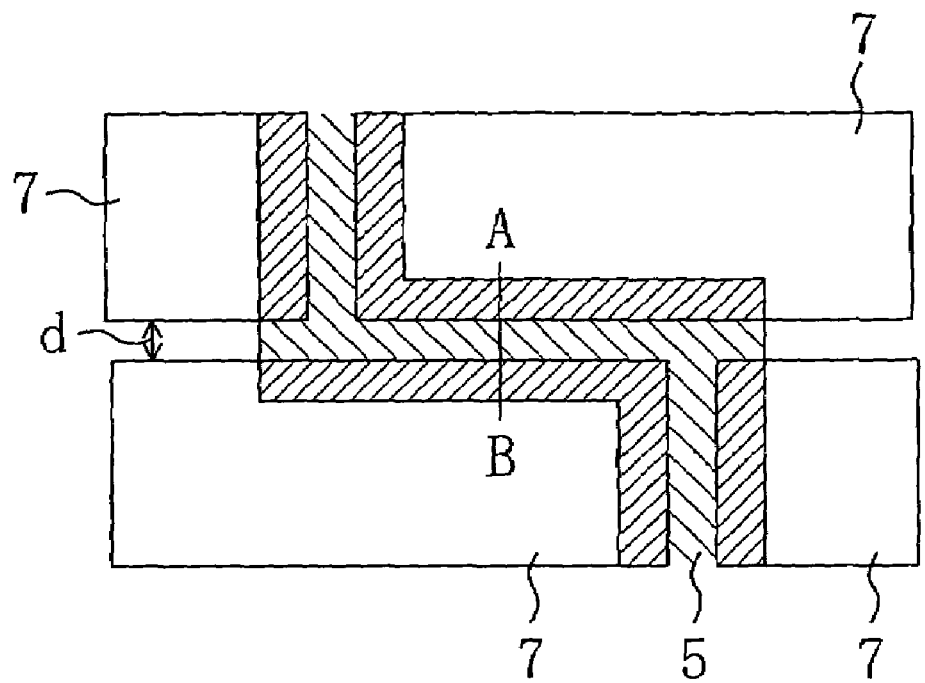
FIG. 9 is a plan view schematically illustrating a pixel arrangement according to the comparative example.
Figure 10:
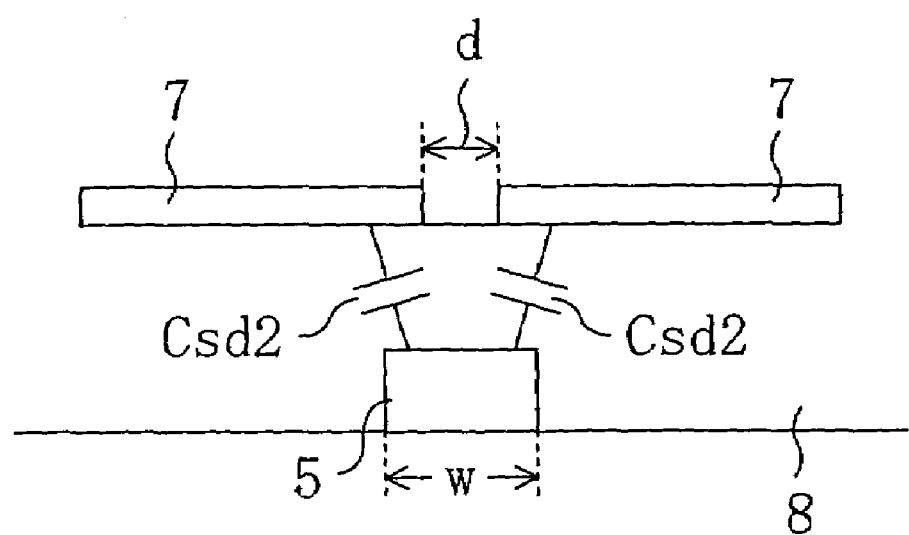
FIG. 10 is a cross-sectional view illustrating a cross section taken along the line A-B of FIG. 9.
Figure 11:
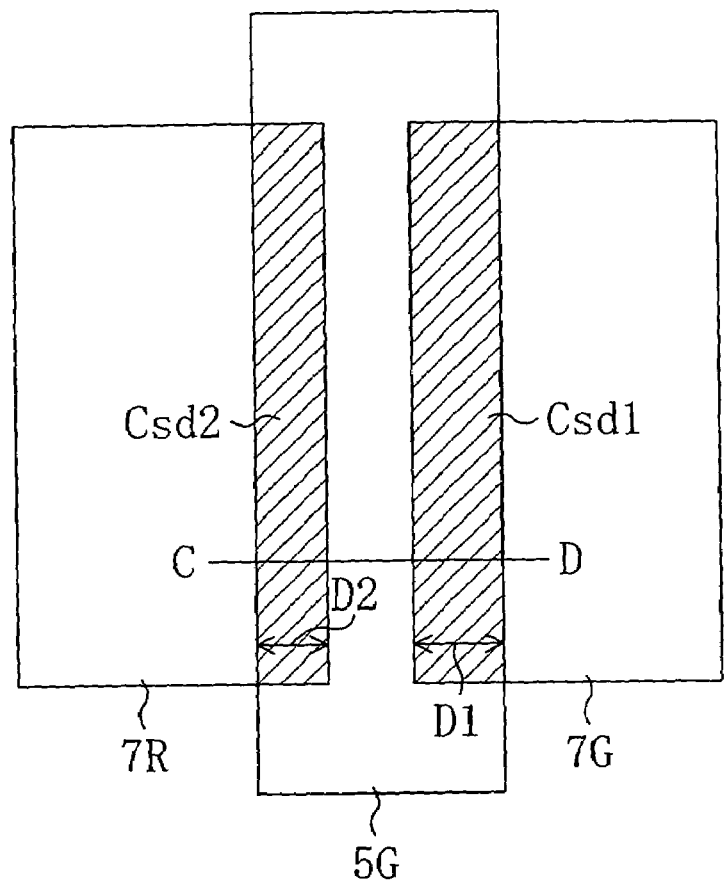
FIG. 11 is a plan view schematically illustrating a pixel arrangement in a display device according to one preferred embodiment of the present invention.
Figure 12:
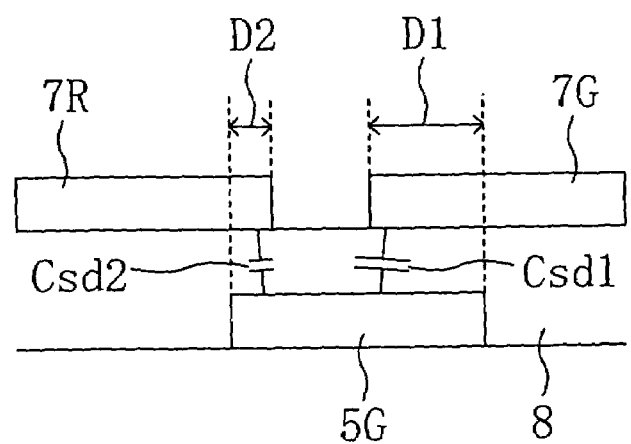
FIG. 12 is a cross-sectional view illustrating a cross section taken along the line C-D of FIG. 11.

Hereafter, embodiments of the present invention will be described with reference to the accompanying drawings. Description of each embodiment provided below is directed to a liquid crystal display (LCD) device. However, a display device according to the present invention includes not only an LCD but also various types of display devices such as an inorganic or organic EL display device, a PDP, a LED display device, a fluorescent display tube, an electric field emission display device, an electrophoretic display device, and an electrochromic display device.

Herein, in the following descriptions, reference numerals formed by a number and an alphabetical character are sometimes presented without the alphabetical character (i.e., only with the number) in order to generically mention equivalent elements. For example, a red pixel source line 5R, a green pixel source line 5G and a blue pixel source line 5B are sometimes generically referred to as "source line(s) 5".

Embodiment 1

A liquid crystal display (LCD) according to EMBODIMENT 1 includes a TFT substrate, a CF (color filter) substrate disposed so as to face the TFT substrate and a liquid crystal layer interposed between the substrates and including a nematic liquid crystal material or the like. The CF substrate includes color filter layers of three colors, i.e., red, green and blue, a common electrode made of ITO (indium tin oxide) or the like which covers the color filter layers and a liquid crystal alignment film which covers the common electrode. The color filter layers may be formed on the TFT substrate.

The TFT substrate of this embodiment will be described with reference to FIG. 1. In a display section 1 of the TFT substrate, a plurality of gate lines 4 each extending from a gate driver 2 and a plurality of source lines 5 each extending from a source driver 3 are formed. A plurality of TFTs 6 as switch elements are formed so that each of the TFTs 6 is located in the vicinity of an intersection point of one of the plurality of gate lines 4 and an associated one of the plurality of source lines 5. A plurality of pixel electrodes 7 are provided so that each of the pixel electrodes 7 is connected to an associated one of the TFTs 6. Over the pixel electrodes 7, a liquid crystal alignment film of polyimide or the like is formed. A signal (image signal) corresponding to each pixel electrode 7 is supplied from an associated one of the source lines 5 to the pixel electrode 7 through one of the TFTs 6 addressed by an associated one of the gate lines 4. Thus, a voltage is applied between each of the pixel electrodes 7 and the common electrode of the CF substrate, so that the optical property of a liquid crystal layer corresponding to a region of each pixel is controlled to perform a display.

In the LCD of this embodiment, a region in which the pixel electrodes 7 and the common electrode overlap is a pixel. Herein, pixels corresponding to color filter layers of three colors, i.e., red, green and blue, respectively, are referred to as "red pixels 7R, green pixels 7G and blue pixels 7B for the purpose of convenience. Moreover, each of the pixel electrodes 7 corresponding to each color is sometimes merely referred to as a "pixel 7". For example, pixel electrodes 7 corresponding to green are sometimes referred to as "green pixels 7G".

On the TFT substrate of FIG. 1, red pixels 7R, green pixels 7G and blue pixels 7B are linearly disposed so that a set of a red pixel 7R, a green pixel 7G and a blue pixel 7B regularly appears in the row direction. Between two adjacent rows, pixels 7 of the same color are offset from each other by 1.5 pitches in the row direction. Each of the gate lines 4 linearly extends in the row direction. In contrast, each of the source lines 5 extends in a zigzag manner, in other words, in the shape of a crank or a curve in the column direction. One of the pixel electrodes 7 to which signals (image signals) are supplied from the same source bus line 5 are arranged left and right alternatively, i.e., in a staggered pattern, with respect to the source bus line 5.

Figure 13:
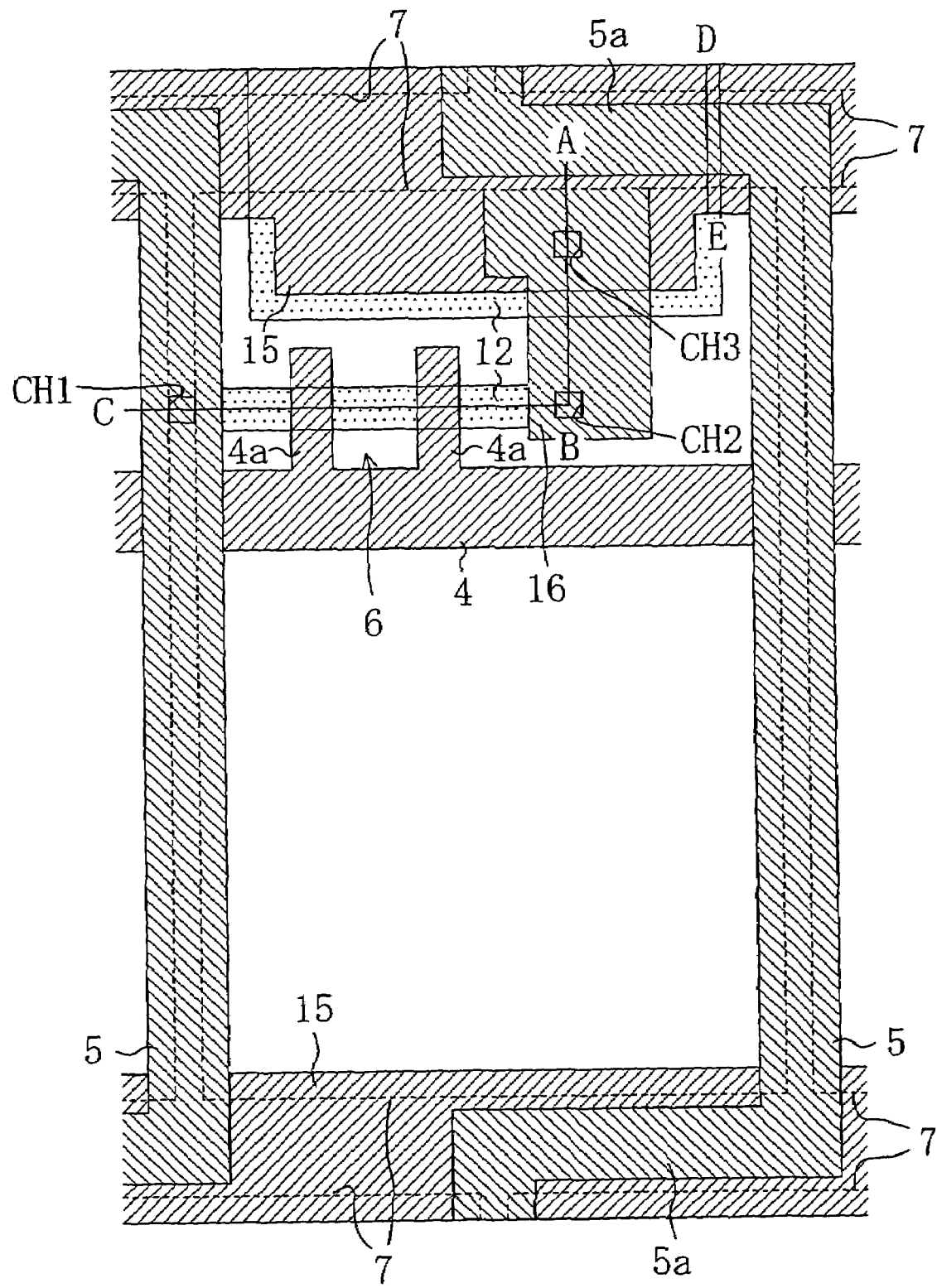
FIG. 13 is an enlarged plan view illustrating a pixel on a TFT substrate.
Figure 14:
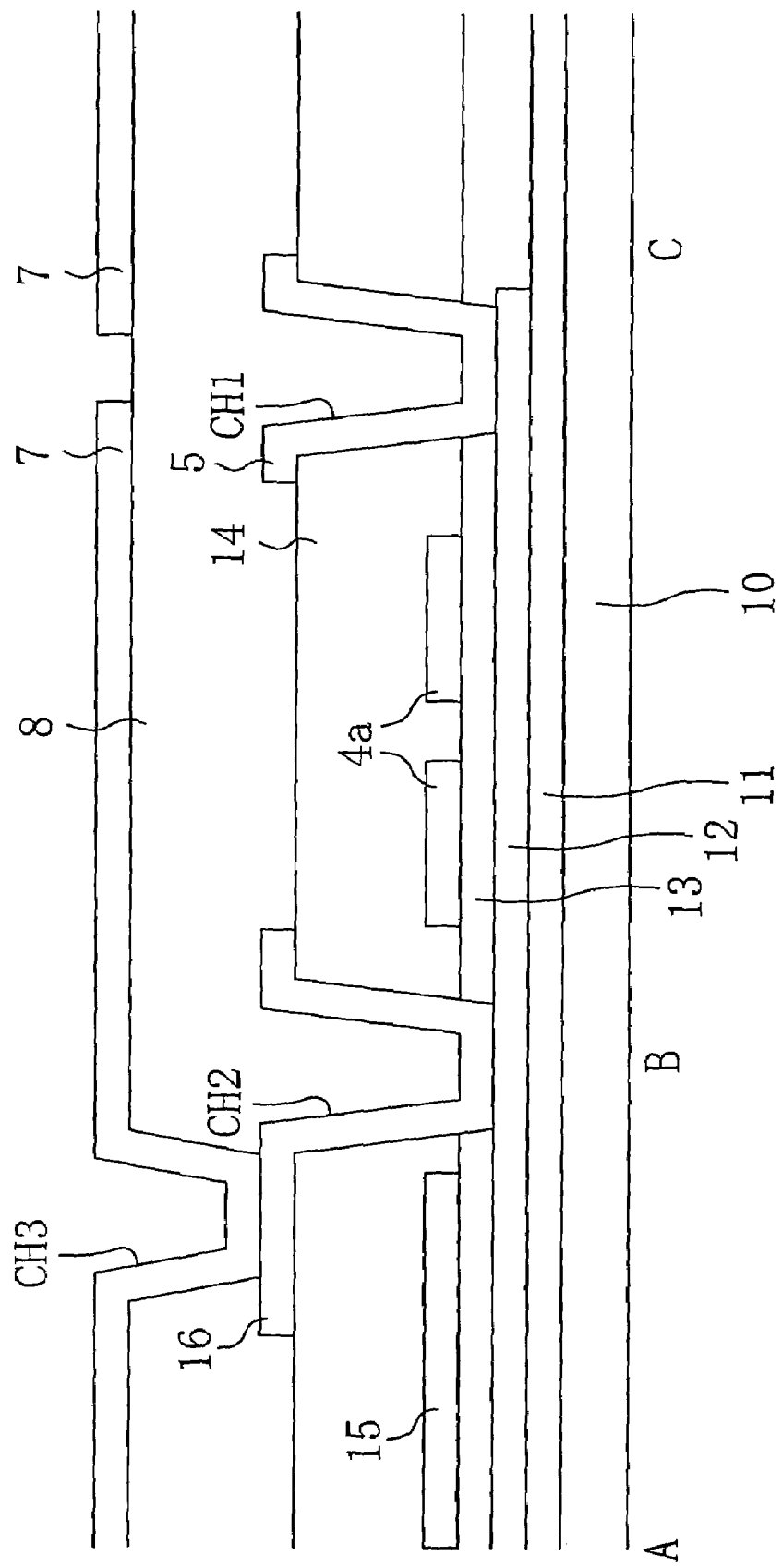
FIG. 14 is a cross-sectional view illustrating a cross section taken along the line A-B-C of FIG. 13.
Figure 15:
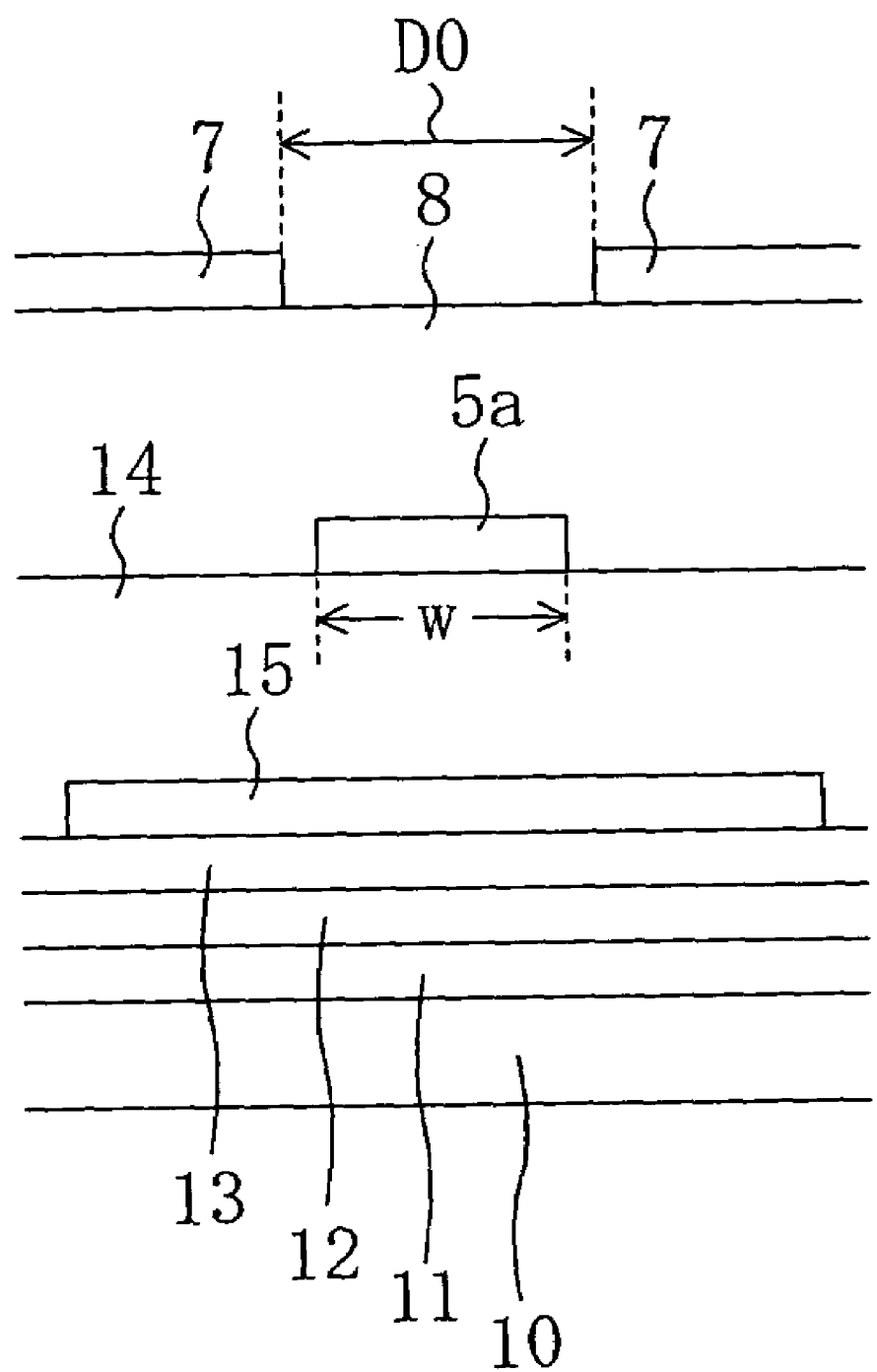
FIG. 15 is a cross-sectional view illustrating a cross section taken along the line D-E of FIG. 13.

FIG. 13 is an enlarged plan view illustrating a pixel on the TFT substrate. FIG. 14 is a cross-sectional view illustrating a cross section taken along the line A-B-C of FIG. 13. FIG. 15 is a cross-sectional view illustrating a cross section taken along the line D-E of FIG. 13. Respective steps for fabricating the TFT substrate of this embodiment will be described with reference to FIGS. 14 and 15 and also the specific structure of the TFT substrate will be described.

First, a SiON film (having a thickness of about 100 nm) is deposited entirely over a glass substrate 10 by plasma CVD (chemical vapor deposition), thereby forming a base coating film 11. An amorphous silicon film (having a thickness of about 50 nm) is deposited entirely over the base coating film 11 by plasma CVD using disilane ($Si_2H_6$) as a source gas. Furthermore, heat treatment is performed to crystallize the amorphous silicon film (i.e., form the amorphous silicon film into a polysilicon film). Thereafter, pattern formation is performed using photolithogaphy, thereby forming a semiconductor layer 12.

A SiON film is deposited (to a thickness of about 115 nm) by plasma CVD entirely over the base coating film 11 on which the semiconductor layer 12 is formed, thereby forming a gate insulation film 13. A tantalum nitride film (having a thickness of about 50 nm) and a tungsten film (having a thickness of about 370 nm) are deposited entirely over the gate insulation film in this order by sputtering. In stead of a lamination film of the tantalum nitride film and the tungsten film, a single layer film or a lamination film may be formed using at least a type of metal element selected from the group of metals consisting of tantalum, tungsten, titanium, molybdenum, aluminum and copper, or an alloy or compound material containing as a main component at least a type of metal element selected from the above-described metal element group.

Thereafter, pattern formation is performed using photolithography to form a gate line 4, a gate electrode 4a, an auxiliary capacitance line 15 and, if desired, a light shielding layer (not shown). The light shielding layer may be in contact (physically connected) with any one of the gate line 4, the gate electrode 4a and the auxiliary capacitance line 15. Alternatively, the light shielding layer may be in contact with none of the gate line 4, the gate electrode 4a and the auxiliary capacitance line 15. Moreover, in this embodiment, a multi-gate structure including two gate electrodes 4a are formed is used. However, a structure including one gate electrode 4a may be used.

Using the gate electrode 4a as a mask, the semiconductor layer 12 is doped with an impurity element through the gate insulation film 13, thereby forming a channel region in part of the semiconductor layer 12 corresponding to the gate electrode 4a and a source electrode region and a drain electrode region in outer sides of the channel region. Thereafter, by performing heat treatment, the doped impurity element is activated. The semiconductor layer 12 is doped with phosphorous as the impurity element to form an N-channel type TFT 6 and the semiconductor layer 12 is doped with boron to form a P-channel type TFT 6.

On the glass substrate 10, a lamination film (having a thickness of about 950 nm) with a two-layer structure of a silicon nitride film and an oxide silicon film is deposited by CVD, thereby forming an interlayer insulation film 14. A contact hole CH1 is formed so as to reach the source electrode region of the semiconductor layer 12 in each of the gate insulation film 13 and the interlayer insulation film 14. Furthermore, a contact hole CH2 is formed so as to reach the drain electrode region of the semiconductor layer 12 in each of the gate insulation film 13 and the interlayer insulation film 14.

A titanium film (having a thickness of about 100 nm), an aluminum film (having a thickness of about 500 nm) and a titanium film (having a thickness of about 100 nm) are deposited in this order entirely over the interlayer insulation film 14 by sputtering. Thereafter, pattern formation is performed using photolithography, thereby forming a source line (including a source electrode) 5 and a drain electrode 16. Heat treatment is performed to hydrogenate the semiconductor layer 12. In the hydrogenation, dangling bonds in the semiconductor layer 12 are terminated with hydrogen contained in the interlayer insulation film 14 formed of a silicon nitride film or the like. Furthermore, an organic insulation material such as acrylic resin is applied over the interlayer insulation film 14 to a thickness of about 1.6 μm, thereby forming an insulation film 8.

A contact hole CH3 is formed in the insulation film 8 so as to reach the drain electrode 16. After an ITO film having a thickness of about 100 nm is deposited over the insulation film 8 by sputtering, pattern formation is preformed using photolithogaphy to form a pixel electrode 7. Furthermore, a thin film made of polyimide based resin is formed over the pixel electrode 7 and the insulation film 8 by printing, and then rubbing is performed thereto to form a liquid crystal alignment film. Through the above-described process steps, the TFT substrate of this embodiment is formed.

Next, respective steps for fabricating a CF substrate and an LCD according to this embodiment will be described. With a black mask material of Cr (chromium) or a black resin applied onto a glass substrate, a light shielding layer (having a thickness of about 100 nm) is formed through a photo process. Coating of color filter films, formation of a predetermined pattern by a photo process, and baking are performed to color filters of red, green and blue, thereby forming color filter layers of red, green and blue (each having a thickness of about 2 μm). Acryl resin is applied onto the color filter layers so as to have a thickness of about 1 μm, thereby forming an over coating layer. On the over coating layer, an ITO film (having a thickness of about 100 nm) is deposited with a mask interposed therebetween, thereby forming a common electrode. As in the same manner as that for forming the TFT substrate, a liquid crystal alignment film is formed on the CF substrate.

On the TFT substrate or the CF substrate, spherical spacers are scattered or pillar spacers are formed. With the substrates bonded to each other with a perimeter sealing member interposed therebetween, baking is performed. The bonded substrates are divided into panel units. A liquid crystal layer is formed by injecting, for example, a TN (twisted nematic) liquid crystal material into a cell of a panel obtained dividing the bonded substrates by decompression and then sealing the material. Through the above-described steps, the LCD of this embodiment is formed.

In the LCD of this embodiment, the distance D0 between adjacent ones of the pixel electrodes 7 with an associated one of the signal lines 5 interposed therebetween in the column direction is equal to or larger than the line width w of the signal line (source line) 5. The distance D0 between adjacent ones of the pixel electrodes 7 in the column direction is the smallest distance from an end of the one of the adjacent pixel electrodes 7 with the signal line 5 interposed therebetween in the column direction to an end of the other of the adjacent pixel electrodes 7. Moreover, the line width w of the signal line (source line) 5 is the distance between both ends of the signal line 5 in the width direction of the signal line 5 (i.e., a direction perpendicular to the direction in which the signal line 5 extends).

In the LCD of this embodiment, part 5a of the signal line 5 extending in the row direction and each of the pixel electrodes 7 do not overlap when viewed from the top. Thus, the parasitic capacitance Csd2 generated due to the signal line 5 is small. Accordingly, a potential influenced by the signal line 5 can be reduced, so that the generation of horizontal stripes can be suppressed.

Assume that the distance D0 between the adjacent pixel electrodes 7 with the signal line 5 interposed therebetween in the column direction is larger than the line width w of the signal line (source line) 5. A space is generated between each of the pixel electrodes 7 and the signal line 5 when viewed from the top and thus light might leak from the space. In this embodiment, the auxiliary capacitance line 15 is formed in a region including at least a region between adjacent pixel electrodes 7 with the signal line 5 interposed therebetween in the column direction. The auxiliary capacitance line 15 functions as a light shielding layer, and therefore light leakage from the space between each of the pixel electrodes 7 and the signal line 5 can be prevented. The auxiliary capacitance line 15 and the semiconductor layer 12 form an auxiliary capacitance with the gate insulation film 13 interposed therebetween.

In this embodiment, the auxiliary capacitance line 15 is formed in a region including at least a region between adjacent pixel electrodes 7 in the column direction. However, instead of the auxiliary capacitance line 15, a scan line (gate line) 4 may be formed. A light shielding layer formed as desired can be disposed in a region including a region between adjacent pixel electrodes 7 in the column direction or row direction.

Embodiment 2

Figure 16:
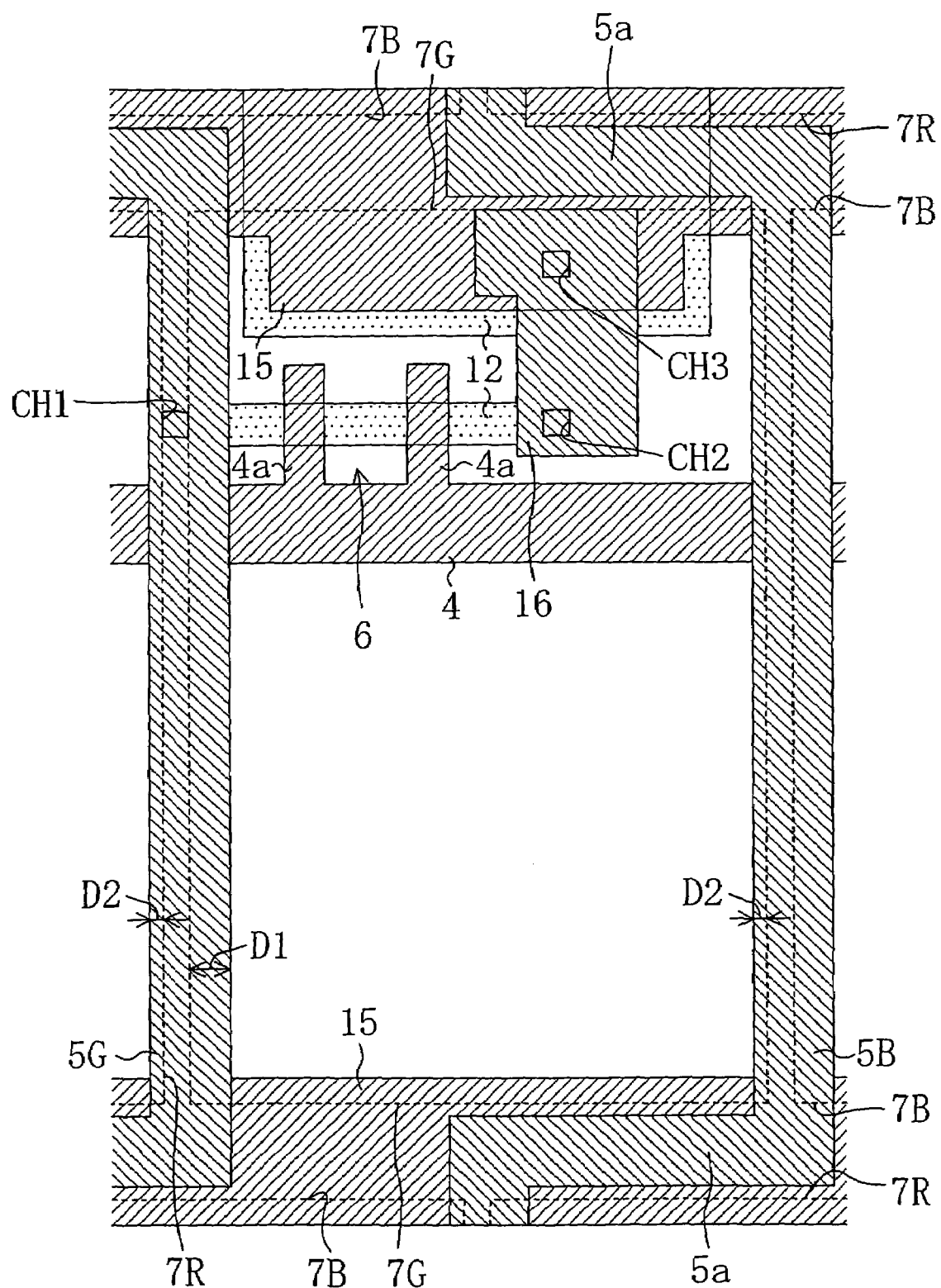
FIG. 16 is an enlarged plan view illustrating a pixel on a TFT substrate according to a second embodiment of the present invention.

An LCD according to EMBODIMENT 2 includes, as the LCD of EMBODIMENT 1, a TFT substrate, a CF substrate disposed so as to face the TFT substrate and a liquid crystal layer interposed between the substrates. The LCD of this embodiment has the similar structure to that of the LCD of EMBODIMENT 1, except for the TFT substrate. FIG. 16 is an enlarged plan view illustrating a pixel on the TFT substrate of this embodiment. In FIG. 16, each component of the TFT substrate having substantially the same function as that of the TFT substrate of EMBODIMENT 1 is identified by the same reference numeral and therefore the description thereof will be omitted.

In the TFT substrate of this embodiment, the signal lines 5 extending in the column direction are disposed so that each of the signal lines 5 is interposed between adjacent two of the pixel electrodes 7 in the row direction and located closer to one of the adjacent two of the pixel electrodes 7 which is driven by the signal line 5. This arrangement will be specifically described with reference to FIG. 16. For example, a green pixel G7 is interposed between a green pixel source line 5G and a blue pixel source line 5B when viewed from the top. Part of the green source line 5G overlaps with the green pixel 7G and another part thereof overlaps with a red pixel 7R when viewed from the top. The width D1 of a region in which the green pixel source line 5G and the green pixel 7G overlap is larger than the width D2 of a region in which the green pixel source line 5G and the red pixel 7R overlap. In other words, the capacitance Csd1 between the green pixel source line 5G and the green pixel 7G is larger than the capacitance Csd2 between the green source line 5G and the red pixel 7R.

In the same manner, the width D1 of a region in which the blue source line 5B and the blue pixel 7B overlap is larger than the width D2 of a region in which the blue pixel source line 5B and the green pixel 7G overlap. In other words, the capacitance Csd1 between the blue source line 5B and the blue pixel 7B is larger than the capacitance Csd2 between the blue source line 5B and the green pixel 7G. Therefore, compared to the case where the source lines 5 extending in the column direction are disposed so that each of the source lines 5 is at an intermediate point between adjacent two of the pixel electrodes 7 in the row direction, the parasitic capacitance Csd1 is increased while the parasitic capacitance Csd2 is reduced.

According to this embodiment, the potential influenced by the parasitic capacitance Csd2 is reduced. Thus, difference in the influenced potential between rows becomes smaller than that in EMBODIMENT 1. Therefore, the occurrence of horizontal stripes can be suppressed.

Embodiment 3

Figure 17:
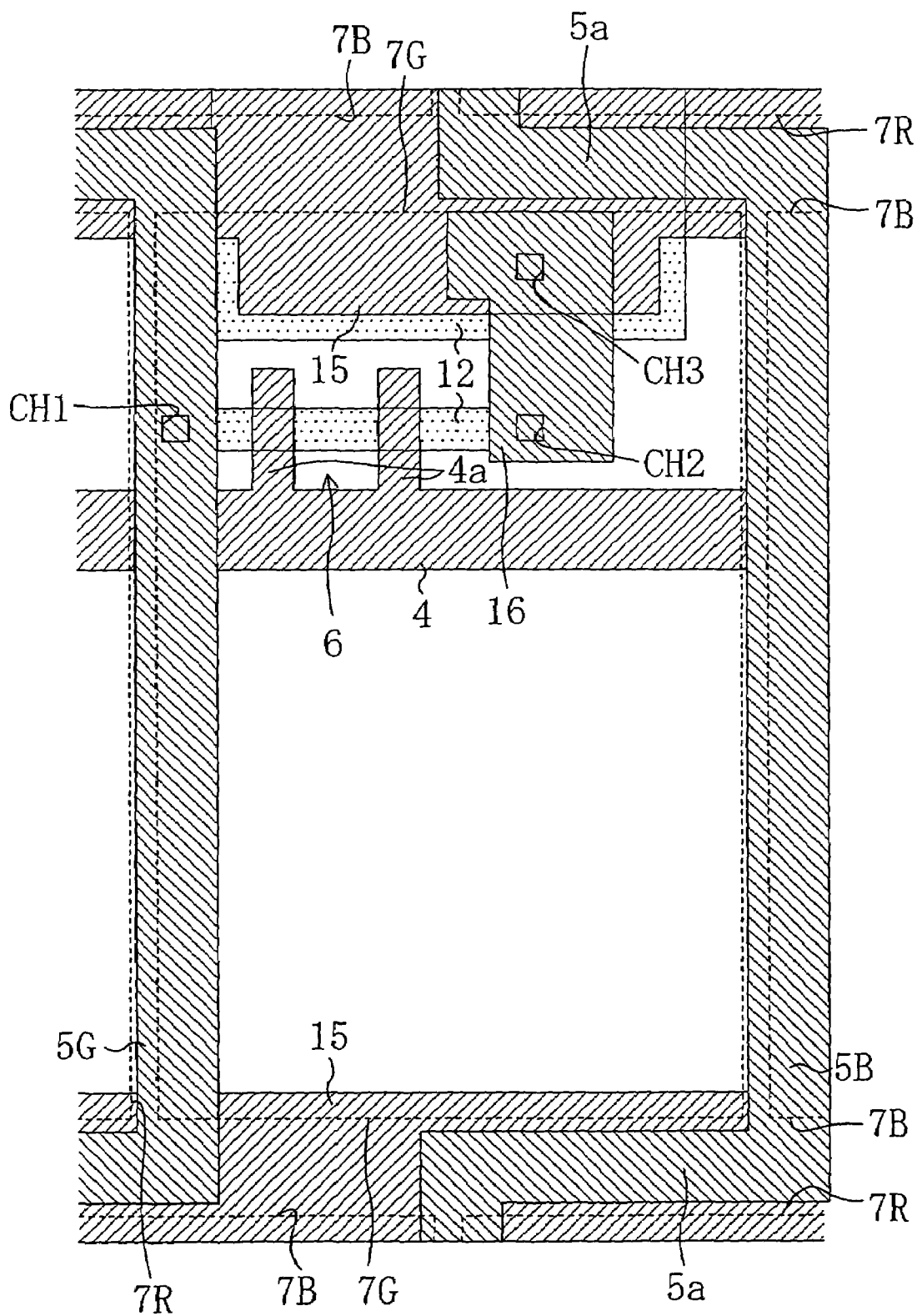
FIG. 17 is an enlarged plan view illustrating a pixel on a TFT substrate according to a third embodiment of the present invention.

In the LCD of EMBODIMENT 2, each of the pixel electrodes 7 and associated ones of the source lines 5 which do not drive the pixel electrode 7 overlap in the row direction. However, to reduce the capacitance Csd2 as much as possible, each pixel electrode and source lines which do not drive the pixel electrode preferably do not overlap. FIG. 17 is an enlarged plan view illustrating a pixel on the TFT substrate of this embodiment. In FIG. 17, each component of the TFT substrate having substantially the same function as that of the TFT substrate of EMBODIMENT 1 is identified by the same reference numeral and therefore the description thereof will be omitted.

In the TFT substrate of this embodiment, part of the signal line 5 extending in the column direction and one of adjacent two pixel electrodes 7 with the signal line 5 interposed therebetween in the row direction overlap, but the signal line 5 and the other one of the adjacent two pixel electrodes 7 do not overlap. This arrangement will be specifically described with reference to FIG. 17. For example, part of a green source line 5G and a green pixel 7G overlap when viewed from the top but the green source line 5G and a red pixel 7R located adjacent to the green pixel 7G in the row direction with the green pixel source line 5G interposed therebetween do not overlap. In the same manner, part of a blue pixel source line 5B and a blue pixel 7B overlap when viewed from the top but the blue pixel source line 5B and a green pixel 7G located adjacent to the blue pixel 7B in the row direction with the blue source line 5B interposed therebetween do not overlap. According to this embodiment, the parasitic capacitance Csd2 generated between the signal line 5 and the pixel electrode 7 can be reduced furthermore, compared to EMBODIMENT 1 and EMBODIMENT 2. Thus, a potential influenced by the capacitance Csd2 can be reduced furthermore and difference in the potential between rows can be reduced furthermore, compared to EMBODIMENT 1 and EMBODIMENT 2. Therefore, the occurrence of horizontal stripes can be suppressed furthermore.

According to this embodiment, a space between a pixel electrode 7 and a signal line 5 might be generated not only in the row direction but also in the column direction and thus light might be leaked from the space. Therefore, a shielding layer is preferably formed in a region including a region between ones of the pixel electrodes 7 located adjacent to each other with an associated one of the signal lines 5 in the row direction.

Embodiment 4

Figure 18:
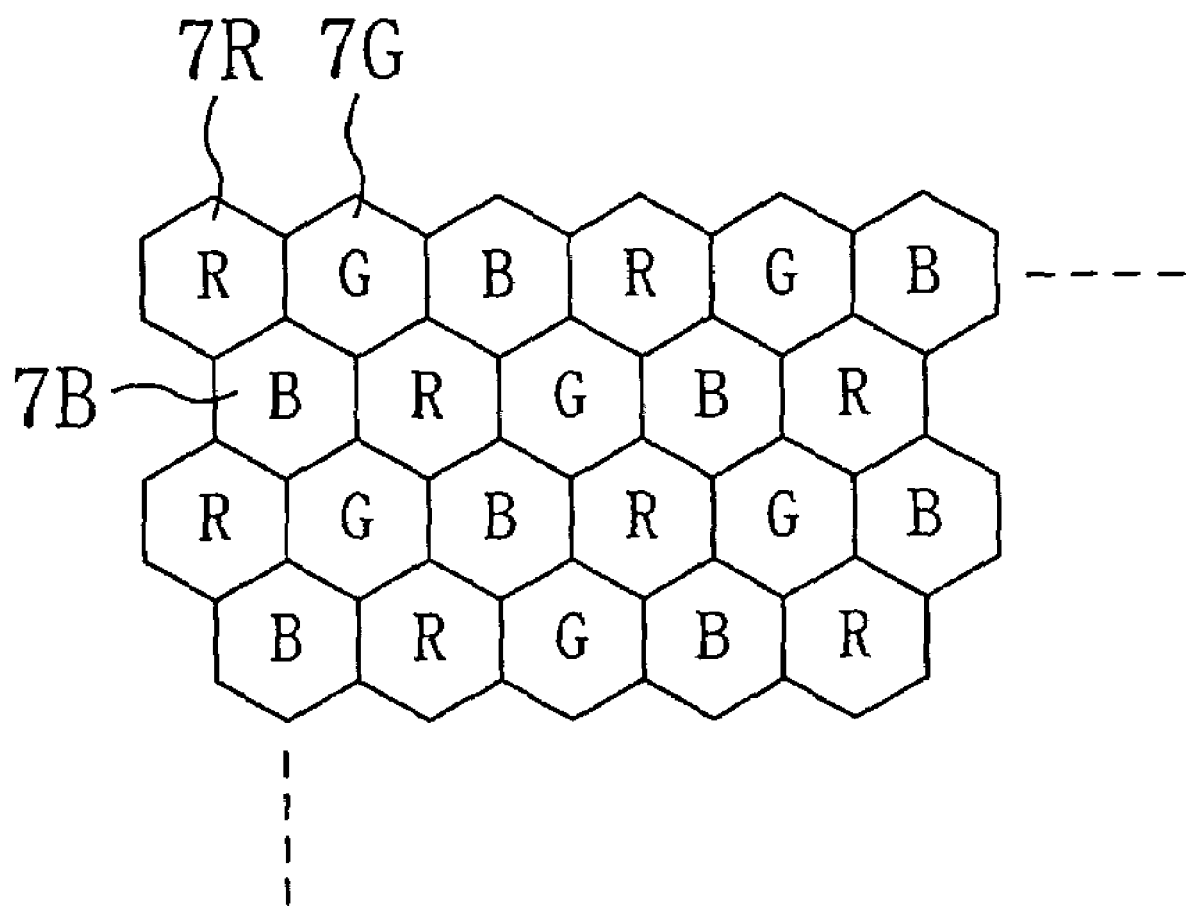
FIG. 18 is a plan view schematically illustrating a modified example of pixel electrodes 7.

In each of EMBODIMENTS 1, 2 and 3, each pixel (electrode) 7 has a rectangular shape. However, the shape of each pixel (electrode) 7 is not limited thereto. FIG. 18 is a plan view schematically illustrating a modified example of the pixel electrodes 7. For example, as shown in FIG. 18, the pixel electrodes 7 may have a hexagonal shape.

In the pixel arrangement of FIG. 18, as in each of EMBODIMENTS 1, 2 and 3, red pixels 7R, green pixels 7G and blue pixels 7B are disposed so that a set of a red pixel 7R, a green pixel 7G and a blue pixel 7B regularly appears in the row direction. Moreover, signal lines extend in the zigzag manner in the column direction and scan lines extend in the zigzag manner in the row direction.

Other Embodiments

In each of EMBODIMENTS 1, 2, 3 and 4, the delta arrangement in which between two adjacent rows, pixels 7 of the same color are offset from each other by 1.5 pitches in the row direction has been described. However, the pixel arrangement in the display device of the present invention is not limited to the delta arrangement but may be a mosaic arrangement or a square arrangement. For example, each of pixels driven by the same signal line in even-numbered rows may be offset from an associated one of pixels in odd-numbered rows by one and a half pixel widths (a pixel pitch in the row direction) or less.

The LCD of each of EMBODIMENTS 1, 2, 3 and 4 is not limited to a transmission type LCD but may be a reflection type LCD or a transmission/reflection type LCD. For example, by forming part of a pixel region of a reflection pixel electrode, a transmission/reflection type LCD can be obtained. In a transmission type LCD, an effective pixel area is reduced because of the existence of the scan lines 4 and the auxiliary capacitance lines 15. However, by forming a reflection pixel electrode in a region in which the scan lines 4 and the auxiliary capacitance lines 15 are formed, an effective pixel area can be increased.

Each of the switch elements for controlling switching between each of the pixel electrodes 7 and an associated one of the signal lines 5 is not limited to a TFT, but may be formed of, for example, a three-terminal element of some other type, such as a MOSFET (metal oxide semiconductor field effect transistor). As another alternative, each of the switch elements may be formed of, instead of a three-terminal element, a non-linear two-terminal element such as a MIM (metal insulator metal).

While the present invention has been described in preferred embodiments, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

The display device of the present invention can be used for various types of display devices such as an LCD, a PDP, an inorganic or organic EL display device, a LED display device, a fluorescent display tube, an electrophoretic display device, and an electrochromic display device. For example, the inventive display can be used for a display of personal computer, a display of a mobile terminal, a colored television and the like.

What is claimed is:
1. A display device comprising:
a plurality of signal lines which extend in a zigzag manner in a column direction and to which image signals are supplied, respectively;
an insulation film which covers the plurality of signal lines;
a plurality of pixel electrodes which are formed on the insulation film and to which the image signals are input from the plurality of signal lines, respectively,
wherein a distance between ones of the pixel electrodes located adjacent to each other in the column direction is equal to or larger than a line width of the signal lines; and wherein when viewed from the top, at least part of the signal line and a first pixel electrode to which an associated one of the image signals is input from the signal line overlap and the signal line and a second pixel electrode located adjacent to the first pixel electrode with the signal line interposed therebetween do not overlap.

2. The display device of claim 1, wherein in a row direction, at least one of the signal lines forms a first capacitance with the first pixel electrode with the insulation film interposed therebetween and forms a second capacitance with the second pixel electrode, that is located adjacent to the first pixel electrode in the row direction, and
wherein the first capacitance is larger than the second capacitance.

3. The display device of claim 1, wherein in a row direction, part of at least one of the signal lines and the first pixel electrode overlap when viewed from the top and another part of the signal line and the second pixel electrode located adjacent to the first pixel electrode with the signal line interposed therebetween overlap when viewed from the top, and
wherein an area of a region in which the first pixel electrode and the signal line overlap is larger than an area of a region in which the second pixel electrode and the signal line overlap.

4. The display device of claim 1, further comprising:
a switch element for controlling switching between the first pixel electrode and an associated one of the signal lines; and
a scan line to which a scanning signal for performing open/close control of the switch element is supplied.

5. The display device of claim 4, wherein a region in which the scan line is formed includes a region between ones of the pixel electrodes located adjacent to each other in the column direction.

6. The display device of claim 5, further comprising: a shielding layer formed in a layer in which the scan line is formed.

7. The display device of claim 4, further comprising: shielding layer formed in the same layer in which the scan line is formed.

8. The display device of claim 1, further comprising: an auxiliary capacitance line for forming an auxiliary capacitance.

9. The display device of claim 8, wherein a region in which the auxiliary capacitance line is formed includes a region between ones of the pixel electrodes located adjacent to each other in the column direction.

* * * * *